(No Model.)
L. G. HAGUE.
ATTACHMENT FOR VEHICLE SHAFTS.
No. 487,524. Patented Dec. 6, 1892.
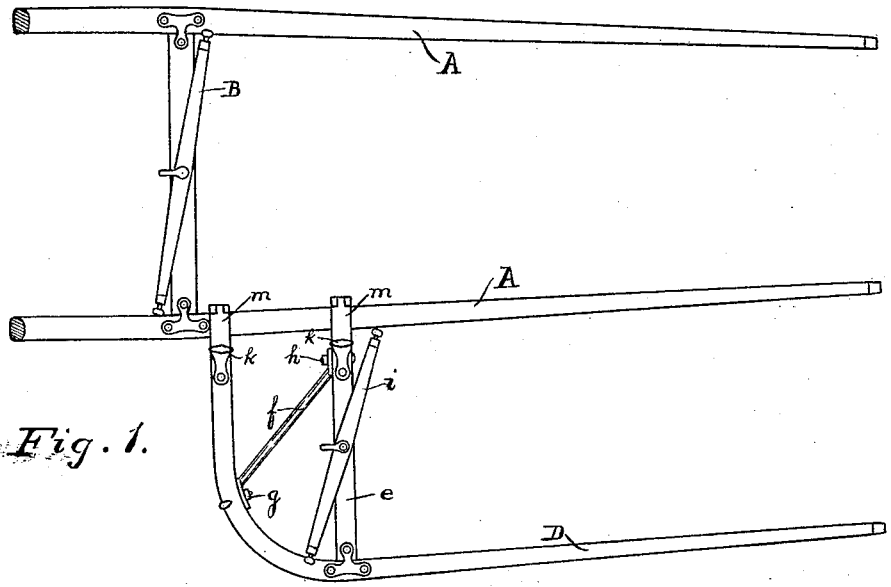
Fig. 1.
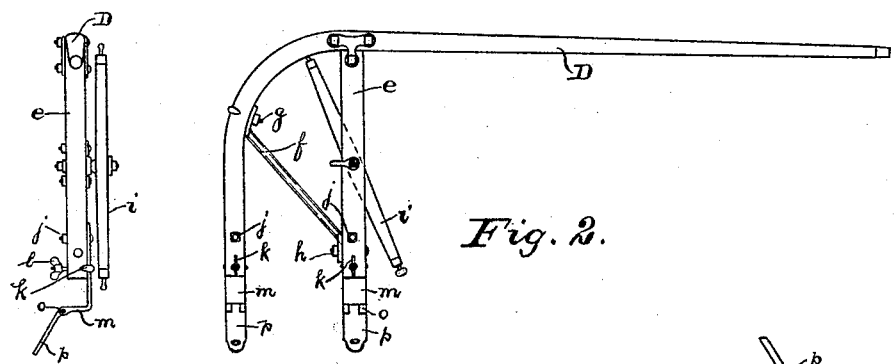
Fig. 3. Fig. 2.
Fig. 5. Fig. 4.
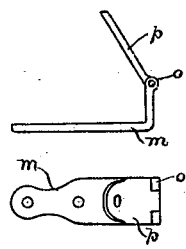
Witnesses.
John A. Fulmer
Jacob P. Lindley.
Inventor.
Luke Glen Hague

UNITED STATES PATENT OFFICE.

LUKE GLASS HAGUE, OF BLOOMINGTON, ILLINOIS.

ATTACHMENT FOR VEHICLE-SHAFTS.

SPECIFICATION forming part of Letters Patent No. 487,524, dated December 6, 1892.

Application filed April 25, 1892. Serial No. 430,619. (No model.)

*To all whom it may concern:*

Be it known that I, LUKE GLASS HAGUE, a citizen of the United States, residing at Bloomington, in the county of McLean and State of Illinois, have invented a new and useful Improvement in Attachment-Shafts for Vehicles; and I do hereby declare the following to be a full, clear, and exact description of the invention, such as will enable others skilled in the art to which it appertains to make and use the same.

My invention is an improved attachment-shaft for vehicle-shafts; and it consists of certain novel features hereinafter described and claimed.

The object of my invention is to provide an improved device and method of attachment which can be attached to the shafts of vehicles on either side and readily detached for conveniently breaking or training colts or young horses by causing them to travel in shafts by the side of a well-broken animal. This object I accomplish by the use of mechanism illustrated in the annexed drawings, in which—

Figure 1 is a perspective view of my invention attached to the shaft of a vehicle. Fig. 2 shows the invention detached and reversed. Fig. 3 is the attachment-bar, showing the hinge-clip open. Fig. 4 shows the hinge-clip open and closed. Fig. 5 shows the T-bolt with wing-nut.

Similar letters refer to similar parts throughout the several views.

Referring to the drawings by letter, A A in Fig. 1 designate the shafts to which attachment is to be made, B the singletree of the shafts, and D the attachment-shaft, shaped as in the figure.

$e$ is the cross-bar by which, together with the bent shaft, attachment is to be made.

$f$ is a brace from cross-bar to bend in shaft to give rigidity and strength to the shaft.

$g$ and $h$ represent nut-and-bolt fastenings of the brace.

$i$ is the singletree of attachment-shaft.

$k\,k$ show the T-bolts fastening hinge-clip to shaft.

$m\,m$ show the hinge-clip; $p\,p$, the hinge of the same.

$j\,j$ are bolts fastening hinge-clip to cross-bar and bent shaft $p\,p$ and $j\,j$ in Figs. 2 and 3.

By the use of the hinge-clip and T-bolt the attachment-shaft and cross-bar may be firmly attached to either shaft—if on the right with singletree above and if on the left with singletree below the cross-bar.

The attachment is made without injury to the shaft, requiring but a minute to attach or detach the attachment-shaft.

In practice a well-trained animal is harnessed to the shafts and the horse to be broken is in like manner harnessed to the pair of shafts formed by the attachment-shaft and its companion shaft of the vehicle, and when necessary a kicking-strap may be used, the same as in a single pair of shafts.

It will be observed that by the use of my device a colt is driven in shafts alongside of a well-trained horse and so taught to travel in shafts on either side, is kept steady by his traveling mate, and is thus quickly broken.

Having thus described my invention, what I claim, and desire to secure by Letters Patent, is—

1. The combination, with the shafts of a vehicle, of the bent attachment-shaft and cross-bar secured to the shaft of a vehicle, as set forth.

2. The combination, with the shafts of a vehicle, of the bent attachment-shaft with cross-bar and brace attached to the shaft of a vehicle by means of hinge-clips and T-bolt, as shown and described.

3. An attachment-shaft for vehicles, consisting of a bent shaft and cross-bar with hinge-clips at the end of shaft and cross-bar by means of which the attachment-shaft and cross-bar may be easily and firmly attached to either shaft of a vehicle, as shown and specified.

In witness whereof I have signed this specification in the presence of two subscribing witnesses.

LUKE GLASS HAGUE.

Witnesses:
JACOB P. LINDLEY,
JOHN A. FULWILER.